(12) United States Patent
Fu et al.

(10) Patent No.: US 12,317,222 B2
(45) Date of Patent: May 27, 2025

(54) INFORMATION PROCESSING METHOD AND APPARATUS, STORAGE MEDIUM, AND PROCESSOR

(71) Applicant: GUANGDONG OPPO MOBILE TELECOMMUNICATIONS CORP., LTD., Guangdong (CN)

(72) Inventors: Zhe Fu, Dongguan (CN); Shukun Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 310 days.

(21) Appl. No.: 17/942,012

(22) Filed: Sep. 9, 2022

(65) Prior Publication Data

US 2023/0007621 A1 Jan. 5, 2023

Related U.S. Application Data

(63) Continuation of application No. PCT/CN2020/083293, filed on Apr. 3, 2020.

(51) Int. Cl.
*H04W 68/00* (2009.01)
(52) U.S. Cl.
CPC ................. *H04W 68/00* (2013.01)
(58) Field of Classification Search
CPC ... H04W 68/00; H04W 68/005; H04W 72/00; H04W 72/02; H04W 72/04; H04W 72/044; H04W 72/0446; H04W 72/0453; H04W 72/20; H04W 72/21; H04W 72/23
See application file for complete search history.

(56) References Cited

U.S. PATENT DOCUMENTS

| | | | | |
|---|---|---|---|---|
| 11,191,006 | B2* | 11/2021 | Kim | H04W 48/08 |
| 2018/0063815 | A1* | 3/2018 | Ishii | H04W 72/12 |
| 2018/0132166 | A1* | 5/2018 | Ishii | H04W 48/10 |
| 2019/0045379 | A1* | 2/2019 | Ishii | H04W 24/02 |
| 2019/0306853 | A1* | 10/2019 | Ishii | H04W 48/14 |

(Continued)

FOREIGN PATENT DOCUMENTS

| | | |
|---|---|---|
| CN | 107645761 A | 1/2018 |
| CN | 107889188 A | 4/2018 |
| CN | 108605268 A | 9/2018 |

(Continued)

OTHER PUBLICATIONS

3GPP TS 23.501 V16.4.0 (Mar. 2020); 3rd Generation Partnership Project; Technical Specification Group Services and System Aspects; System architecture for the 5G System (5GS); Stage 2 (Release 16), entire document.

(Continued)

*Primary Examiner* — Kevin D Mew
(74) *Attorney, Agent, or Firm* — Ladas & Parry, LLP

(57) ABSTRACT

The present disclosure discloses an information processing method and apparatus, a storage medium, and a processor. The method includes: a terminal determines information or service that needs to be transmitted; and the terminal requests system information from a network device when the terminal is determining transmission of the information or the service. The present disclosure solves the technical problem of the uncertainty of the system information request process.

12 Claims, 5 Drawing Sheets

(56) References Cited

U.S. PATENT DOCUMENTS

2020/0092820 A1* 3/2020 Chen .................. H04W 52/08
2021/0022055 A1* 1/2021 Tseng .................. H04W 76/23

FOREIGN PATENT DOCUMENTS

| CN | 109314897 A | 2/2019 | | |
|---|---|---|---|---|
| CN | 109819525 A | 5/2019 | | |
| CN | 110337078 A | 10/2019 | | |
| CN | 110430606 A | 11/2019 | | |
| EP | 3301978 A1 | 4/2018 | | |
| WO | WO-2017197063 A1 | * | 11/2017 | ........... H04B 7/0408 |
| WO | 2018010144 A1 | | 1/2018 | |
| WO | WO-2018016922 A1 | * | 1/2018 | ............ H04W 48/08 |
| WO | WO-2018202298 A1 | * | 11/2018 | ............ H04W 48/08 |
| WO | WO-2018203633 A1 | * | 11/2018 | ............ H04W 48/02 |
| WO | 2021196195 A1 | | 4/2020 | |

OTHER PUBLICATIONS

International Search Report (ISR) dated Dec. 30, 2020 for Application No. PCT/CN2020/083293, and Its English Translation provided by WIPO.
Written Opinion (WOSA) dated Dec. 30, 2020 for Application No. PCT/CN2020/083293, and its English Translation provided by Google Translate.
Intel Corporation, Remaining open issues on on-demand request in Connected mode, R2-2000478, 3GPP TSG-RAN WG2 Meeting #109-e, Electronic meeting, Feb. 24-Mar. 6, 2020, all pages.
Summon to attend the Oral proceedings of corresponding European application No. 20928102.1, dated Mar. 27, 2024.
The First Office Action of corresponding European application No. 20928102.1 dated Sep. 13, 2020.
The first Office Action and search report of corresponding Chinese patent application No. 202310102063.7, dated Jun. 27, 2024.
Samsung, "System Information Signalling Design in NR", R2-163371, 3GPP TSG-RAN WG2 Meeting #94, Nanjing, China, May 23-27, 2016.
Nokia, Nokia Shanghai Bell, "Summary of [AT109e][032][IIOT] Accurate Reference Timing", R2-2002281,3GPP TSG-RAN WG2 Meeting #109e, Elbonia, Online, Feb. 24-Mar. 6, 2020.
3GPP TS 38.331 V15.9.0 (Mar. 2020), "3rd Generation Partnership Project, Technical Specification Group Radio Access Network, NR, Radio Resource Control (RRC) protocol specification, (Release 15)".
The Extended European Search Report of corresponding European application No. 20928102.1, dated Mar. 7, 2023.
The second Office Action of corresponding Chinese application No. 202310102063.7, dated Nov. 9, 2024.

* cited by examiner

INFORMATION PROCESSING METHOD AND APPARATUS, STORAGE MEDIUM, AND PROCESSOR

CROSS-REFERENCE TO RELATED APPLICATIONS

This disclosure is a continuation of International Application No. PCT/CN2020/083293, filed on Apr. 3, 2020, which is hereby incorporated by reference in its entirety.

TECHNICAL FIELD

The present disclosure relates to the field of communications and, in particular, to an information processing method and apparatus, a storage medium, and a processor.

BACKGROUND

Nowadays, a terminal may need to request a network device to send system information. However, the judgment conditions for the terminal to trigger the request process cannot be clear, and then it is unclear how the terminal obtains the request, to trigger the network device to send system information, which cannot ensure that a network device is enabled to send system information to a terminal when the terminal needs the system information, so there is a technical problem of the uncertainty of the system information request process.

For the above problem, no effective solution has been proposed yet.

SUMMARY

At least some embodiments of the present disclosure provide an information processing method and apparatus, a storage medium, and a processor, to at least solve the technical problem of the uncertainty of the system information request process.

According to an embodiment of the present disclosure, an information processing method is provided. The method includes: determining, by a terminal, information or service that needs to be transmitted; and requesting, by the terminal, system information from a network device when the terminal is determining transmission of the information or the service.

According to an embodiment of the present disclosure, another information processing method is also provided. The method includes: obtaining, by a network device, a request, where the request is sent by a terminal when the terminal needs to transmit information or service; and sending, by the network device, system information to the terminal in response to the request.

According to an embodiment of the present disclosure, an information processing apparatus is also provided. The apparatus is provided in a terminal and includes: a first determining unit, configured to determine information or service that needs to be transmitted; and a requesting unit, configured to request system information from a network device when the information processing apparatus is determining transmission of the information or the service.

According to an embodiment of the present disclosure, another information processing apparatus is also provided. The apparatus is provided in a network device and includes: a third obtaining unit, configured to obtain a request, where the request is sent by a terminal when the terminal needs to transmit information or service; and a second sending unit, configured to send system information to the terminal in response to the request.

According to an embodiment of the present disclosure, a storage medium is also provided. The storage medium stores therein a computer program, where the computer program is configured to when run, execute any one of the information processing methods described above.

According to an embodiment of the present disclosure, a processor is also provided. The processor is configured to run a program, where the program is configured to: when run, execute any one of the information processing methods described above.

According to an embodiment of the present disclosure, an electronic apparatus is also provided, including a memory and a processor, where the memory stores therein a computer program, and the processor is configured to run the computer program to execute any one of the information processing methods described above.

According to an embodiment of the present disclosure, a chip is also provided. The chip includes a processor, and the processor is configured to call from a memory and run a computer program, to cause a device installed with the chip to execute any one of the information processing methods described above.

According to an embodiment of the present disclosure, a computer program product is also provided. The computer program product includes computer program instructions, and the computer program instructions cause a computer to execute any one of the information processing methods described above.

According to an embodiment of the present disclosure, a computer program is provided, and the computer program causes a computer to execute any one of the information processing methods described above.

In at least some embodiments of the present disclosure, the terminal determines the information or the service that needs to be transmitted; and when the terminal is determining transmission of the information or the service, the terminal requests system information from the network device. That is to say, in the present disclosure, firstly the information or the service that needs to be transmitted is determined, and the terminal being determining transmission of the information or the service is taken as a trigger condition to trigger the network device to send the system information, which clarifies the judgment condition for the terminal to trigger a request process, and ensures that the terminal can request the system information from the network device when the system information is needed, and thereby ensures the integrity and certainty of the system information request process, which solves the technical problem of the uncertainty of the system information request process, and achieves the technical effect of ensuring the integrity and certainty of the system information request process.

BRIEF DESCRIPTION OF DRAWINGS

The accompanying drawings described herein are used to provide a further understanding of the present disclosure and constitute a part of the present disclosure. The illustrative embodiments of the present disclosure and descriptions thereof are used to explain the present disclosure and do not constitute an improper limitation of the present disclosure.

In the accompanying images.

DESCRIPTION OF EMBODIMENTS

Figure 1:
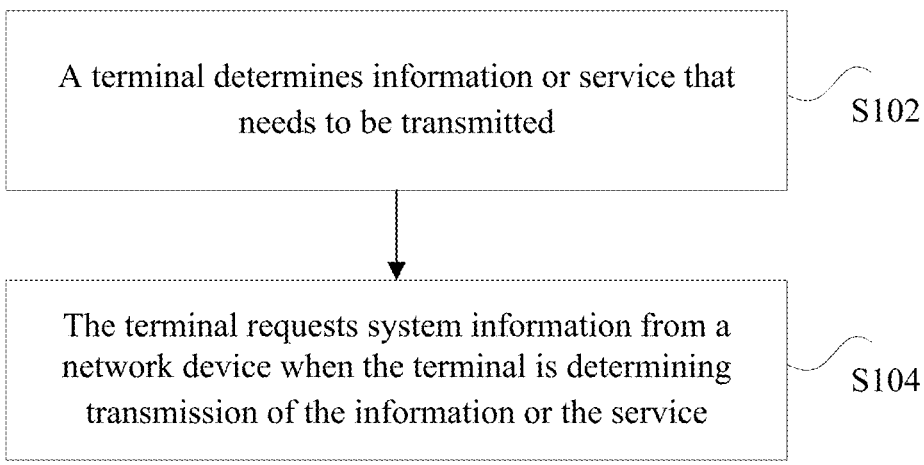
FIG. 1 is a flowchart of an information processing method according to an embodiment of the present disclosure.

For those skilled in the art to better understand the solution of the present disclosure, the technical solutions in the embodiments of the present disclosure will be described clearly and completely in conjunction with the accompanying drawings in the embodiments of the present disclosure. The described embodiments are part of the embodiments of the present disclosure, rather than all of the embodiments. Based on the embodiments in the present disclosure, all other embodiments obtained by those of ordinary skill in the art without creative work shall fall within the protection scope of the present disclosure. The terms "first", "second", etc. in the description, claims, and the above-mentioned drawings of the embodiments of the present disclosure are used to distinguish similar objects and are not necessarily used to describe a specific sequence or sequential order. It should be understood that the data used in this way can be interchanged under appropriate circumstances, so that the embodiments of the present disclosure described here can be implemented in a sequence other than those illustrated or described here. The terms "including" and "having" and any variations thereof are intended to cover non-exclusive inclusions. For example, a process, a method, a system, a product, or a device that includes a series of steps or units is not necessarily limited to those steps or units clearly listed. Instead, they may include other steps or units that are not clearly listed or are inherent to the process, method, product, or device.

The technical solutions of the embodiments of the present disclosure can be applied to various communication systems, such as a global system of mobile communication (GSM for short), a code division multiple access (CDMA for short) system, a wideband code division multiple access (WCDMA for short) system, general packet radio service (GPRS for short) system, a long term evolution (LTE for short) system, an LTE frequency division duplex (FDD for short) system, an LTE time division duplex (TDD for short) system, a universal mobile telecommunication system (UMTS for short), a worldwide interoperability for microwave access (WiMAX for short) communication system, or a 5G system, etc. A communication system applied in an embodiment of the present disclosure may include a network device, and the network device may be a device that communicates with a terminal device (or called a communication terminal or a terminal). The network device can provide communication coverage for a specific geographic area and may communicate with terminal devices located in the coverage area. In an implementation, the network device may be a base station (BTS for short) in a GSM system or a CDMA system, a base station (NodeB, NB for short) in a WCDMA system, or an evolutional base station (Evolutional Node B, eNB or eNodeB for short) in an LTE system, or a radio controller in a cloud radio access network (CRAN for short). Alternatively, the network device may be a mobile switching center, a relay station, an access point, a vehicle-mounted device, a wearable device, a hub, a switch, a bridge, a router, a network device in a 5G network, or a network device in a future evolved public land mobile network (PLMN for short).

The communication system also includes at least one terminal device located within the coverage area of the network device. As used herein, "terminal device" includes, but is not limited to, being connected via a wired line, for example, public switched telephone networks (PSTN for short), a digital subscriber line (DSL for short), a digital cable, a direct cable; and/or via another data connection/network connection; and/or via a wireless interface, for example, for a cellular network, a wireless local area network (WLAN for short), a digital television network such as a DVB-H network, a satellite network, an AM-FM broadcast transmitter; and/or via an apparatus of another terminal device that is set to receive/transmit communication signals; and/or Internet of things (IoT for short) equipment. A terminal device set to communicate through a wireless interface may be referred to as a "wireless communication terminal", a "wireless terminal" or a "mobile terminal". Examples of the mobile terminal include, but are not limited to, a satellite or cellular phone; a personal communications system (PCS for short) terminal that may combine a cellular radio phone with data processing, fax, and data communication capabilities; a PDA (Personal Digital Assistant) that may include a radio telephone, a pager, Internet/Intranet access, a Web browser, a note pad, a calendar, and/or a global positioning system (GPS for short) receiver; and a conventional laptop and/or handheld receiver or other electronic devices including radio telephone transceivers. The terminal device may refer to an access terminal, user equipment (UE for short), a user unit, a user station, a mobile console, a mobile station, a remote station, a remote terminal, a mobile device, a user terminal, a terminal, a wireless communication device, a user agent, or a user device. The access terminal may be a cellular phone, a cordless phone, a session initiation protocol (SIP for short) phone, a wireless local loop (WLL for short) station, a PDA, a handheld device with a wireless communication function, a computing device or other processing devices connected to a wireless modem, a vehicle-mounted device, a wearable device, a terminal device in a 5G network, or a terminal device in a future evolved PLMN, etc.

In an implementation, device to device (D2D) communication may be performed between terminal devices. In an implementation, the 5G system or 5G network may also be referred to as an NR (New Radio) system or NR network. In an implementation, the communication system may also include other network entities such as a network controller and a mobility management entity, which is not limited to the embodiments of the present disclosure. It should be understood that a device with a communication function in a network/system in an embodiment of the present disclosure may be referred to as a communication device. The communication device may include a network device and a terminal device that have communication functions, and the network device and the terminal device may be the specific devices described above, which will not be repeated here. The communication device may also include other devices in the communication system, for example, a network controller, a mobility management entity, and other network entities, which are not limited to the embodiments of the present disclosure. It should be understood that the terms "system" and "network" are often used interchangeably herein. The term "and/or" herein is only an association relationship describing the associated objects, which means that there can be three kinds of relationships, for example, A and/or B can mean: there are three cases where A exists alone, both A and B exist, and B exists alone. In addition, the character "/" used herein generally indicates that the associated objects before and after are in an "or" relationship.

According to an embodiment of the present disclosure, an information processing method is provided. The steps shown in the flowcharts of the accompanying drawings may be executed in a computer system such as a computer system including a set of computer-executable instructions. Although logical orders are shown in the flowcharts, in some cases steps shown or described may be performed in orders different from those herein. An information processing method according to an embodiment of the present disclosure is described below from the terminal side. FIG. 1 is a flowchart of an information processing method according to an embodiment of the present disclosure. As shown in FIG. 1, the method may include the steps as follows.

Step S102, a terminal determines information or service that needs to be transmitted. In this embodiment, the information that needs to be transmitted by the terminal may be positioning information that needs to be transmitted in a network in a positioning scenario, or may also be vehicle information, etc. The service that needs to be transmitted by the terminal may be corresponding to a service transmission requirement, and may be a time-sensitive network (TSN for short) service, or may also be other services supported by the terminal, such as a service of ultra-reliable and low-latency communication (URLLC for short)/TSN, or may also be a service of URLLC/TSN corresponding to packet data unit (PDU for short) session control requested to be established; or may also be a requested service requiring a high-precision clock and so on.

Step S104, the terminal requests system information from a network device when the terminal is determining transmission of the information or the service. In this embodiment, when the terminal is determining transmission of the information or the service, the terminal may trigger to send a request to the network device, to trigger, through the request, the network device to send the system information, so that the terminal meets the requirement of the transmission of the information or the service mentioned above through the system information. The network device may include a 5G base station (gNB) and a core network.

In an implementation, the system information mentioned above in this embodiment is valid system information for enabling the terminal to normally perform information transmission or service transmission, and the system information may be high-precision clock information, positioning information, vehicle to X (V2X) information, and the like. For example, when the system information is clock information, based on the requirement of TSN service transmission, when a TSN service is transmitted in the 5G network, the terminal needs to ensure time synchronization with the network device, which may be to meet the time synchronization accuracy requirement of 1 μs, then the network device needs to send the clock information in the system information to the terminal, and the terminal performs time synchronization with the network device according to the clock information sent by the network device, thereby meeting the requirement on time synchronization accuracy. The specific clock information may be reference clock information (referenceTimeInfo), and the clock information may also be referred to as time information.

In this embodiment, through the steps S102 and S104 mentioned above, firstly the information or the service that needs to be transmitted is determined, and the terminal being determining transmission of the information or the service is taken as a trigger condition to trigger the network device to send the system information, which clarifies the judgment condition for the terminal to trigger the request process, and ensures that the terminal can request the system information from the network device when needed, thereby ensuring the integrity and certainty of the system information request process, which solves the technical problem of the uncertainty of the system information request process, and achieves the technical effect of ensuring the integrity and certainty of the system information request process. The above method of this embodiment will be further described below.

As an optional implementation, step S104 the terminal requests the system information from the network device includes: if there is invalid system information when the terminal is determining the transmission of the information or the service, the terminal requests the system information from the network device. In this embodiment, the terminal may have invalid system information when determining the transmission of the information or the service, that is, there is no valid system information when the terminal is determining the transmission of the information or the service, and then the terminal is triggered to request system information from the network device. So, the above lack of valid system information, that is, there being invalid system information is the trigger condition for the terminal to request the system information from the network device. In an implementation, there being invalid system information mentioned above may include but is not limited to, not saving the required system information, such as not saving valid high-precision clock information, and may also be saved system information having expired, a serving cell having changed, a tracking area having changed, determining that there is no valid system information, or other information which may be taken as a condition for triggering the terminal to request system information from the network device, and there's no particular limitation on this here.

As an optional implementation, the system information is sent by the network device through at least one of the following information: a system information block (SIB for short), or radio resource control (RRC for short) information. The RRC information includes RRC reconfiguration information and/or downlink direct transfer information DLinformationtransfer. The system information block (SIB) may include an SIB for sending clock information, an SIB for sending positioning information, and an SIB for sending Vehicle-to-X V2X information. In this embodiment, the terminal requests the system information from the network device, and the network device can determine the way to send the system information to the terminal. In an implementation, the system information may be sent to the terminal by the network device through the system information block (SIB), that is, the network device may broadcast the system information block to the terminal, and the system information block may include an SIB for sending clock information (for example, the SIB is SIB9), may also include an SIB for sending positioning information (for example, the SIB is PosSIB), or may also include an SIB for sending vehicle to X (vehicle to X, V2X for short) information (for example, the SIB may be SIB21, SIB26). In an implementation, the system information in this embodiment may also be sent to the terminal by the network device through radio resource control (RRC) information, that is, the network device may broadcast RRC information to the terminal, and the RRC information may be RRC reconfiguration information (dedicated system information delivery dedicatedSystemInformationDelivery), and it may also be downlink direct transfer information (DLinformationtransfer).

As an optional implementation, the step S104 that the terminal requests the system information from the network device includes: the terminal requests the system information from the network device based on indication information corresponding to the information or the service. In this embodiment, the information or the service corresponds to the indication information, and the indication information may be used to indicate the service that the terminal requests to be transmitted. For example, the indication information may be used to indicate that the service currently requested by the terminal is a service of URLLC/TSN, a PDU session requested to be established corresponds to a service of URLLC/TSN, a service requested requires a high-precision clock, or a service supported by the terminal includes a URLLC/TSN service. The terminal in this embodiment may obtain the indication information, and request system information from the network device according to the indication information.

As an optional implementation, the terminal requesting the system information from the network device based on the indication information of the information or the service includes: the terminal sends a system information demand request (which may be an on-demand SI request) to the network device based on the indication information; and the terminal obtains the system information, where the system information is sent by the network device in response to the system information demand request. In this embodiment, after obtaining the indication information, the terminal may send the system information demand request to the network device based on the indication information. The system information demand request, which is a request message for the terminal to request system information, is used to request the system information from the network device. After receiving the system information demand request, the network device may determine that the terminal requires the system information, for example, determine that the terminal requires high-precision clock information, and then send the same to the terminal.

In this embodiment, when the terminal is in a connected state (CONNECTED), and there is a search space (common search space) on an activated bandwidth part (BWP for short), and the system information broadcast status (si-BroadcastStatus) is set to broadcasting status (Broadcasting), the terminal may read information of an SIB at a corresponding position; when the terminal is in the connected state, and there is a common search space on the activated BWP, and the si-BroadcastStatus is set to not broadcasting status (notBroadcasting), the terminal may trigger the transmission of a dedicated system information block request (DedicatedSIBRequest) and read information of an SIB at a corresponding position; when the terminal is in the connected state, and there is no common search space on the activated BWP, the terminal triggers the transmission of the DedicatedSIBRequest and expects the network to send dedicated information to provide the requested SIB information to the terminal. Of course, in the connected state, a UE may also use other dedicated information to request system information, such as a random access channel (RACH for short) resource, UE assistance information (UEassistanceInformation), and so on. If the terminal is in an idle state (idle)/inactive state (inactive) state, the terminal can also use a random access channel (RACH) procedure, or a dedicated RRC message, such as an RRC system information request (RRCSystemInfoRequest), UEassistanceInformation, etc., to request corresponding system information from the network device. For example, the terminal requests high-precision clock information from the network device. In an implementation, for the above UEassistanceInformation, when a UE is configured to be able to request system information, or when a UE is configured to be able to request system information and has no valid system information, or when a UE is configured to be able to request system information and determines that the UE has a demand (for example, as indicated by non-access stratum (NAS for short) to access stratum (AS for short), or when a UE is configured to be able to request system information, has no valid system information, and determines that the UE has a demand (for example, as indicated by NAS to AS), or when a UE determines that the UE has a demand (for example, as indicated by NAS to AS), or when a UE has no valid system information and determines that the UE has a demand (for example, as indicated by NAS to AS), the UE sends UEassistanceInformation mentioned above to request the system information.

As an optional implementation, the terminal requesting the system information from the network device based on the indication information of the information or the service includes: an access stratum (AS) of the terminal requests the system information from the network device based on the indication information. In this embodiment, the terminal may include an access stratum (AS for short), that is, a UE AS. The above AS can obtain the indication information mentioned above, and then the system information demand request may be used to request the system information from the network device.

As an optional implementation, the method further includes: a non-access stratum (NAS) of the terminal sends the indication information to the AS. In this embodiment, the terminal may further include a non-access stratum (NAS), that is, a UE NAS. The above NAS in this embodiment may send the indication information to the AS, so that the AS may request the system information from the network device based on the indication information, and the network device may further send the system information to the AS mentioned above.

As an optional implementation, the non-access stratum (NAS) of the terminal sending the indication information to the AS includes: the NAS sends the indication information to the AS during at least one of the following request processes: a service request Service request process, a packet data unit session establishment request (PDU session establishment request) process, or a packet data unit session modification request (PDU session modification request) process. The NAS in this embodiment may send the indication information mentioned above to the AS during the request process, and the request process may include, but is not limited to, a Service request process, a PDU session establishment request process, a PDU session modification request process, and the like.

The above method of this embodiment may be applied to an uplink (UL) information or service triggering process, which achieves the purpose of obtaining a system information by the terminal, ensures that the terminal triggers to request the system information from the network device when needed, and clarifies the judgment condition for the terminal to trigger the request process, thereby ensuring the integrity and certainty of the system information request process.

As an optional implementation, the indication information is a cause value (cause), that is, the above-mentioned indication information may be embodied as the cause value (cause), and the terminal requests the system information from the network device based on the cause value (cause) corresponding to the information or the service. Correspondingly, the network device determines, according to the cause value (cause), that the purpose of the terminal is to request the system information. In an implementation, the cause value (cause) may be used to indicate that a service requested by the terminal is a TSN service or a service of URLLC/TSN, or that a PDU session requested to be established corresponds to a service of URLLC/TSN, or that a service requested requires a high-precision clock, or that a service supported by the terminal includes a URLLC/TSN service.

As an optional implementation, the cause value is carried by at least one of the following information: establishment cause (establishmentCause) information, reestablishment cause (reestablishmentCause) information, or resume cause (ResumeCause) information. The establishmentCause mentioned above may be carried in a connection establishment process, the reestablishmentCause mentioned above may be carried in a connection reestablishment process, and the ResumeCause mentioned above may be carried in a connection resume process. In an implementation, after the AS obtains the cause value mentioned above, if there is invalid system information when the terminal is determining the transmission of the information or the service, the terminal needs to obtain system information. The terminal may send a system information demand request to the network device to conduct a request, and the system information demand request may be a request message for requesting clock information. After learning the request, the network device may send the system information or dedicated signaling accordingly. When the terminal is in an idle/inactive state, the terminal may request corresponding system information from the network device by using a RACH process or dedicated RRC messages, such as RRCSystemInfoRequest, UEassistanceInformation, etc. In an implementation, the network device receives a request message (ondemandSIforSIB9) of clock information sent by the terminal, and determines that the terminal device requires high-precision clock information, and then the network device sends the clock information to the terminal through SIB9 or dedicated RRC information. When the indication information is the cause value, this embodiment can be applied to the scenario where the terminal is in the idle/inactive state, realize the purpose of obtaining the system information by the terminal in the UL information or service triggering process, ensure that the terminal can request the system information to the network device when needed, and clarify the judgment condition for the terminal to trigger a request process, thereby ensuring the integrity and the certainty of the system information request process.

As an optional implementation, the method further includes: the terminal obtains a paging message sent by the network device, and the terminal obtains the indication information from the paging message. It should be noted that the paging message may carry the indication information until the paging message is sent to the network device, and afterwards, the indication information will not be carried, that is, the indication information will not be further sent to the terminal; alternatively, the paging message may always carry the indication information, not only when the paging message is sent to the network device, but also when the paging message is sent to the terminal, that is, the indication information may be sent to the terminal. That is to say, the indication information mentioned above may be sent to the terminal (visible to the terminal) or only sent to the base station (invisible to the terminal). In the case where the indication information mentioned above is only sent to the base station, in other words in the case where a paging message does not always carry the indication information, the terminal in this embodiment obtains a paging message from the network device, but the paging message does not carry the above indication information; in the case where the indication information mentioned above is sent to the terminal, in other words in the case where a paging message always carries the indication information, the terminal in this embodiment obtains the paging message sent by the network device, and then the terminal obtains the indication information from the paging message because the indication information is carried in the paging message.

As an optional implementation, the paging message sent by the network device includes a paging message sent by the core network to the base station, where the paging message carries the indication information. In this embodiment, the network device may include a core network and a base station, where the core network may be an access and mobility management function (AMF for short), and the base station may be referred to as an access network and maybe a gNB. The core network sends a paging message to the base station, and may carry the indication information corresponding to the information or the service in the paging message. The indication information may be used to indicate that the service requested by the terminal is a TSN service, or that a PDU session requested to be established corresponds to a service of URLLC/TSN, or that the service requested requires a high-precision clock.

As an optional implementation, the terminal obtaining the paging message sent by the network device includes: the terminal obtains the paging message sent by the base station; and/or, the terminal obtaining the indication information from the paging message includes: the terminal obtains the indication information from the paging message sent by the base station. In this embodiment, the terminal may obtain the paging message sent by the base station, which carries the indication information, and the indication information may be used to indicate that the service requested by the terminal is a TSN service, or that a PDU session requested to be established corresponds to a service of URLLC/TSN, or that the service requested requires a high-precision clock. The terminal obtains the indication information from the paging message sent by the base station, and then the terminal may send the system information demand request to the network device according to the indication information for requesting system information, and then the network device sends the system information to the terminal by broadcasting a system information block or a dedicated RRC message to the terminal.

As an optional implementation, the paging message is sent to the base station from the core network in a case of an incoming call or a data push. The core network may send a paging message to a terminal and carry the indication information mentioned above in the case of an incoming call or a data push.

As an optional implementation, the terminal obtaining the paging message sent by the base station includes: the terminal receives the paging message sent by the base station at a paging occasion of the terminal, where the paging message carries the indication information. The base station may receive the paging message sent by the core network and send the paging message to the terminal at the paging occasion of the terminal, so that the terminal can receive the paging message at the paging occasion of the terminal. After receiving the paging message at the corresponding position, the terminal in this embodiment can determine, according to the indication information, the information or the service that needs to be requested, for example, the terminal can determine that the service is a TSN service, or that a PDU session requested to be established corresponds to a service of URLLC/TSN, or that the service requested requires a high-precision clock, or determine a service requiring a high-precision clock. At that point, the terminal may send a system information demand request to the network device for requesting corresponding system information, and then the network device broadcasts a system information block or RRC information in response to the system information demand request, to send the system information to the terminal. In an implementation, the system information demand request may be an on-demand SI request, or may be a dedicated message, such as at least one of a dedicated RACH, RRC SystemInfoRequest, DedicatedSIBRequest, or UEassistanceInformation.

The above method of this embodiment gives a method to trigger downlink (DL) information or service, and the system information demand request to the network device is still triggered by the terminal, which avoids the additional processing of the paging message by the base station, ensures that the network device learns the system information demand of the terminal and sends the required system information to the terminal, to meet the transmission demand of the terminal for the information or the service.

As an optional implementation, the step S104 that the terminal requests system information from the network device includes: the terminal obtains the system information, which is determined by the network device according to the indication information of the information or the service carried in the paging message; or the terminal obtains the system information, which is sent by a network device according to the indication information of the information or the service carried in the paging message. In this embodiment, since the paging message may carry the indication information until the paging message is sent to the network device, and then the paging message will no longer carry the indication information, in this case, the network device may determine the system information according to the indication information of the information or the service carried in the paging message, and then the terminal obtains the determined system information; in an implementation, the network device directly sends the system information to the terminal according to the indication information of the information or the service carried in the paging message, and then the terminal obtains the system information sent by the network device.

As an optional implementation, the paging message is sent by the core network to the base station, and the system information is determined by the base station according to the indication information carried in the paging message; or the paging message is sent by the core network to the base station, and whether to send the system information is determined by the base station according to the indication information carried in the paging message. In this embodiment, the core network sends the paging message to the base station, and the paging message carries the indication information corresponding to the information or the service that the terminal needs to transmit. The indication information may be used to indicate that the service requested is a TSN service, or that the PDU session requested to be established corresponds to a service of URLLC/TSN, or that the requested service requires a high-precision clock, etc. Since the indication information is no longer sent to the terminal, the base station may directly determine the corresponding information or service according to the indication information, and then determine the system information. The base station may send the system information to the terminal through broadcasting a system information block. Alternatively, the base station may also send the system information to the terminal through system information or a dedicated RRC message according to the indication information and a terminal identifier when the terminal is in a connected state. Of course, in a connected state, the UE may also use other dedicated information to request the system information, such as a RACH resource, UEassistanceInformation, and so on. In an implementation, in this embodiment, after the paging message is sent by the core network to the base station, the base station may also determine whether to send the system information according to the indication information.

This embodiment achieves the purpose of obtaining system information by the terminal during the DL information or service triggering process through the method mentioned above, ensuring that the network device sends the system information required by the terminal to the terminal after learning the requirement of sending the system information, and meeting the transmission requirement of the information or the service of the terminal.

As an optional implementation, the terminal requesting the system information from the network device includes: the terminal requests the system information from the network device according to quality of service (QoS for short) information of the information or the service. In this embodiment, the terminal may determine the information or service that the terminal currently needs to transmit according to the quality of service (QoS) information to be established or QoS information already established, for example, the service that needs to be transmitted is a URLLC/TSN service, or a service requiring a high-precision clock, etc. When the terminal is determining the transmission of the information or the service, if there is no valid system information, for example, there is no valid clock information, the terminal will request valid system information from the network device.

As an optional implementation, the terminal requesting system information from the network device includes: the terminal sends a system information demand request to the network device, and the terminal obtains the system information sent by the network device in response to the system information demand request. In this embodiment, if there is no valid system information when the terminal is determining the transmission of the information or the service, the terminal may send a system information demand request to the network device. After receiving the system information demand request, the network device sends the system information to the terminal device by broadcasting a system information block or RRC information in response to the system information demand request. In an implementation, the system information demand request may be an on-demand SI request, or may be a dedicated message, such as at least one of a dedicated RACH, RRCSystemInfoRequest, DedicatedSIBRequest, or UEassistanceInformation.

As an optional implementation, the terminal determines QoS information according to one of a user plane bearer (DRB), a packet data unit session (PDU session), and a quality of service flow (QoS flow), where the DRB (Data Radio Bearer) is configured by the base station for the terminal through an RRC reconfiguration message. In this embodiment, the terminal may determine QoS information of information or the service according to the established DRB, where the base station may configure the DRB bearer for the terminal device through the RRC reconfiguration message. In this embodiment, the QoS information of the information or the service may also be determined according to the PDU session, or the QoS information of the information or the service may be determined according to the QoS flow, so that the terminal can request the system information from the network device according to the quality of service (QoS) information of the information or the service.

It should be noted that, in the respective methods mentioned above, when the terminal requests system information from the network, the terminal sends the network a request message for the terminal to request system information. Specifically, an on-demand SI request is an optional name for a request message for a terminal to request system information. The specific message of the on-demand SI request may be a dedicated RRC message or a dedicated resource, such as a RACH resource, DedicatedSIBRequest, RRCSystemInfoRequest, UEassistanceinformation, and so on. In an implementation, when the UE sends a system information request message, regardless of the state of the UE, the UE may use a dedicated resource, for example at least one of a dedicated RACH, RRCSystemInfoRequest, DedicatedSIBRequest, or UEassistanceInformation.

Figure 2:
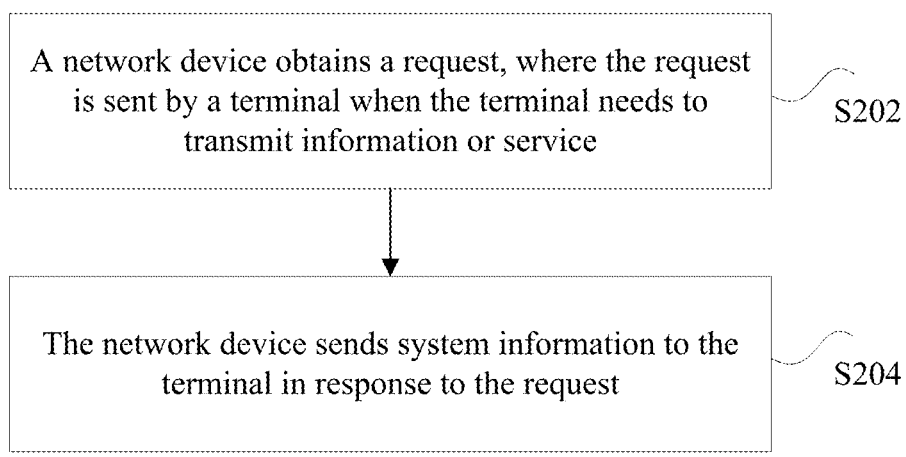
FIG. 2 is a flowchart of another information processing method according to an embodiment of the present disclosure.

The information processing method of this embodiment will be described from the network device as follows. It should be noted that the information processing method at the network side in this embodiment corresponds to the information processing method at the terminal side described above. FIG. 2 is a flowchart of another information processing method according to an embodiment of the present disclosure. As shown in FIG. 2, the method may include the steps as follows.

Step S202, a network device obtains a request, where the request is sent by a terminal when the terminal needs to transmit information or service.

Step S204, the network device sends system information to the terminal in response to the request.

As an optional implementation, the request mentioned above is sent by the terminal in a case where there is an information or service transmission and there is invalid system information. The invalid system information may include, but is not limited to, not saving the required system information, such as not saving valid high-precision clock information; or may also be the saved system information has expired, a serving cell having changed, a tracking area having changed, or determining that there is no valid system information, or other information which may be taken as the condition for triggering the terminal to request the system information from the network device, and there is no particular limitation on this here.

As an optional implementation, the step S202 that the network device obtains the request includes: the network device obtains the request which is sent by the terminal based on indication information corresponding to the information or the service. In an implementation of the network device obtaining the request which is sent by the terminal based on the indication information of the information or the service as mentioned above, the network device may obtain a system information demand request (which may be an on-demand SI request), where the system information demand request is sent by the terminal based on the indication information. After learning the request, the network device may send system information or dedicated signaling accordingly. In an implementation, the system information demand request may also be a dedicated message, for example, at least one of a dedicated RACH, RRC SystemInfoRequest, DedicatedSIBRequest, or UEassistanceInformation.

As an optional implementation, in an implementation of the network device obtaining the request which is sent by the terminal based on the indication information of information or service as mentioned above, the network device may obtain the request which is sent by an access stratum (AS) of the terminal based on the indication information. The indication information mentioned above may be sent by a non-access stratum (NAS) of the terminal to the AS. The indication information may be sent by the NAS to the AS during at least one of the following processes: a Service request process, a PDU session establishment request process, or a PDU session modification request process. In an implementation, the indication information is a cause value (cause), and the network device determines, according to the cause value (cause), that the purpose of the terminal is to request system information. The cause value is carried in at least one of the following information: establishmentCause information, reestablishmentCause information, or ResumeCause information. In an implementation, the establishmentCause may be carried in a connection establishment process, the reestablishmentCause may be carried in a connection reestablishment process, and the ResumeCause may be carried in a connection resume process.

As an optional implementation, the method further includes: the network device sends a paging message to the terminal, where the paging message carries the indication information. It should be noted that in this embodiment, the paging message may carry the indication information until the paging message is sent to the network device, and afterward, the paging message will not carry the indication information, that is, the indication information will not be sent to the terminal again; in an implementation, the paging message may always carry the indication information, not only when the paging message is sent to the network device, but also when the paging message is sent to the terminal, that is, the indication information may be sent to the terminal. That is to say, the indication information mentioned above may be sent to the terminal (visible to the terminal) or only sent to the base station (invisible to the terminal). In the case where the indication information mentioned above is only sent to the base station, in other words in the case where the paging message does not always carry the indication information, the terminal in this embodiment obtains the paging message from the network device, but the paging message does not carry the above indication information; in the case where the indication information mentioned above is sent to the terminal, in other words in the case where the paging message always carries the indication information, the network device sends the paging message to the terminal, and then the terminal obtains the indication information from the paging message because the indication information is carried in the paging message. As an optional implementation, the network device sending the paging message to the terminal includes: a core network sends the paging message carrying the indication information to a base station; and/or the base station sends the paging message carrying the indication information to the terminal, where the core network sending the paging message to the base station includes: the core network sends the paging message to the base station in a case of an incoming call or a data push, and the paging message sent by the base station is received by the terminal at a paging occasion of the terminal.

As an optional implementation, the network device sending the system information to the terminal includes: the network device determines to send the system information according to indication information of the information or the service carried in the paging message, and sends the system information to the terminal. As an optional implementation, the network device determining to send the system information according to the indication information of the information or the service carried in the paging message includes: a core network sends the paging message to a base station, where the paging message carries the indication information, and the base station determines the system information according to the indication information; or the core network sends the paging message to the base station, where the paging message carries the indication information, and the base station determines whether to send the system information according to the indication information carried in the paging message.

As an optional implementation, the network device sending the system information to the terminal includes: a base station sends the system information to the terminal according to Quality of Service (QoS) information of the information or the service; and the method further includes: the base station determines the QoS information according to one of a DRB, a PDU session, and a QoS flow, where the base station configures the DRB for the terminal through an RRC reconfiguration message. In this embodiment, the network device determines the corresponding information or service to be transmitted according to the QoS information to be established or already established corresponding to the configured DRB, where the service may be a URLLC/TSN service or a service requiring high-precision clock information, etc., and then the network device sends the system information corresponding to the determined information or services to the terminal. In this embodiment, when the terminal has a common search space on an activated BWP, and si-BroadcastStatus is set to Broadcasting, the network device broadcasts information of this SIB at a corresponding position, and the terminal reads the SIB at the corresponding position; if the terminal has a common search space on an activated BWP, and si-BroadcastStatus is set to notBroadcasting, the network device broadcasts information of this SIB at a corresponding position, and the terminal device reads the information of the SIB at the corresponding position (and accordingly, the terminal device may determine to read according to an indication of reading SIB9 in the DRB configuration or after UE checks the relationship between DRB and QoS); if the terminal does not have a common search space on an activated BWP, the network device sends the system information to the terminal through dedicated RRC information.

As an optional implementation, the network device sends the system information to the terminal through at least one of the following information: an SIB or RRC information, where the RRC information includes RRC reconfiguration information and/or Dlinformationtransfer. As an optional implementation, the system information block (SIB) includes: an SIB for sending clock information, an SIB for sending positioning information, an SIB for sending V2X information. For example, the SIB for sending clock information may be SIB9, the SIB for sending positioning information may be PosSIB, and the SIB for sending V2X information may be SIB21, SIB26.

It should be noted that, in the respective methods mentioned above, when the terminal requests system information from the network device, the terminal sends the network device a request message that the terminal requests system information. Specifically, an on-demand SI request is an optional name for the request message for the terminal to request system information. The specific message of the on-demand SI request may be a dedicated RRC message or a dedicated resource, for example, a RACH resource, DedicatedSIBRequest, RRCSystemInfoRequest, Ueassistanceinformation, and so on. In an implementation, when the UE sends the system information request message, regardless of the state of the UE, the UE may use a dedicated resource, for example, at least one of a dedicated RACH, RRC SystemInfoRequest, DedicatedSIBRequest, or UeassistanceInformation.

The above-mentioned method of this embodiment is described below through a preferred implementation, and specifically, an example is taken where the system information is clock information, and the system information demand request is an on-demand SI request.

Figure 3:
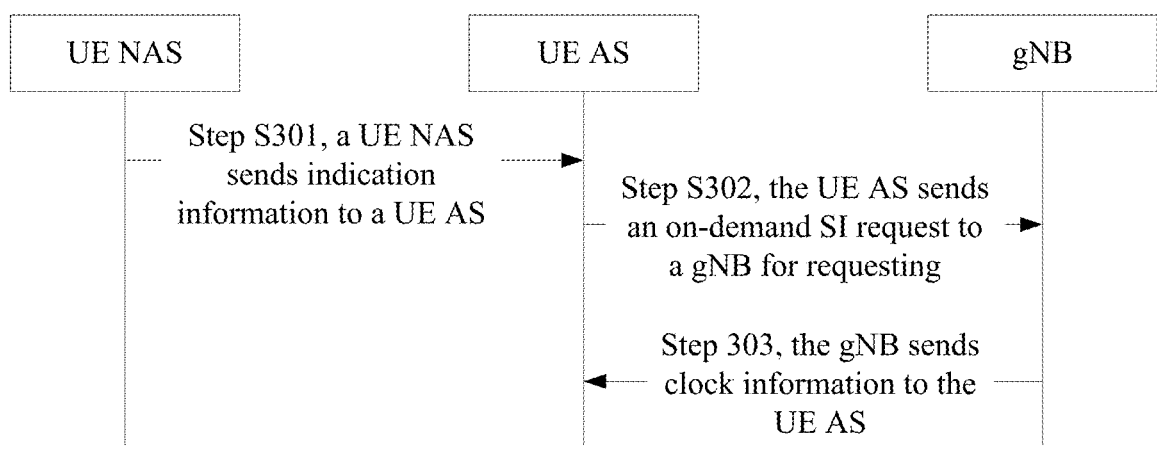
FIG. 3 is a flowchart of an information processing method for interaction between a terminal and a network device according to an embodiment of the present disclosure.

In the related art, a UE may request the network device to send high-precision time information, and it is not clear how the UE AS obtains the request to trigger the network device to send a high-precision clock. Therefore, a method is needed to enable the UE AS to send a request for a high-precision clock to the network device when needed, to clarify a judgment condition for the UE AS to trigger the request process and ensure the integrity and certainty of the system information request process. The embodiment provides a method for requesting system information transmission, an example is provided as follows. FIG. 3 is a flowchart of an information processing method for interaction between a terminal and a network device according to an embodiment of the present disclosure. As shown in FIG. 3, the method may include the steps as follows.

S301, a UE NAS sends indication information to a UE AS. In this embodiment, the UE NAS sends the indication information to the UE AS, which may be used to indicate that a currently requested service is a service of URLLC/TSN, or that a PDU session requested to be established corresponds to a service of URLLC/TSN, or that a requested service requires a high-precision clock, or that a service supported by the UE includes a URLLC/TSN service. The UE NAS may send the indication information to the AS in a Service request process, a PDU session establishment request process, a PDU session modification request process.

Step S302, the UE AS sends an on-demand SI request to a gNB for requesting. After the UE AS obtains the indication information, if the UE does not have valid high-precision clock information currently, the UE needs to obtain the time information, that is, obtain SIB9 or Dlinformationtransfer. The UE may send an on-demand SI request for requesting, and the on-demand SI request may include a request message for clock information (ondemandSIforSIB9).

When the terminal is in a connected state, and there is a common search space on an activated bandwidth part, and the si-BroadcastStatus is set to Broadcasting, the terminal may read information of the SIB at a corresponding position; when the terminal is in a connected state, and there is a common search space on an activated BWP, and the si-BroadcastStatus is set to notBroadcasting, the terminal may trigger the transmission of DedicatedSIBRequest and read information of the SIB at a corresponding position; when the terminal is in a connected state, and there is no common search space on an activated BWP, the terminal triggers the transmission of DedicatedSIBRequest and expects the network to send dedicated information to provide the requested SIB information to the terminal. Of course, in the connected state, the UE may also use other dedicated information to request system information, such as a RACH resource, UeassistanceInformation, and so on. If the terminal is in an idle/inactive state, the terminal may also use a random access channel (RACH) process, or a dedicated RRC message, such as RRCSystemInfoRequest, UeassistanceInformation, etc., to request corresponding system information from the network device, for example, the terminal requests high-precision clock information from the network device. In an implementation, for the above UeassistanceInformation, when a UE is configured to be able to request system information, or when a UE is configured to be able to request system information and has no valid system information, or when a UE is configured to be able to request system information and determines that there is a demand (for example, as indicated by NAS to AS), or when a UE is configured to be able to request system information, has no valid system information, and determines that there is a demand (for example, as indicated by NAS to AS), or when a UE determines that there is a demand (for example, as indicated by NAS to AS), or when a UE has no valid system information and determines that there is a demand (for example, as indicated by NAS to AS), the UE sends UeassistanceInformation mentioned above to request system information.

Step S303, the gNB sends clock information to the UE AS. The gNB receives the ondemandSIforSIB9 sent by the UE, considers that the UE requires high-precision clock information, and may send high-precision clock information to the UE through SIB9 or dedicated RRC, for example, RRC reconfiguration information or Dlinformationtransfer.

Through the method mentioned above, the embodiment gives a method for the UE AS to obtain high-precision time information in the UL service triggering process, ensures that the UE AS requests high-precision clock information from the gNB when needed, clarifies the judgment condition for the UE AS to trigger the request process, and ensures the integrity and certainty of the system information request process.

Figure 4:
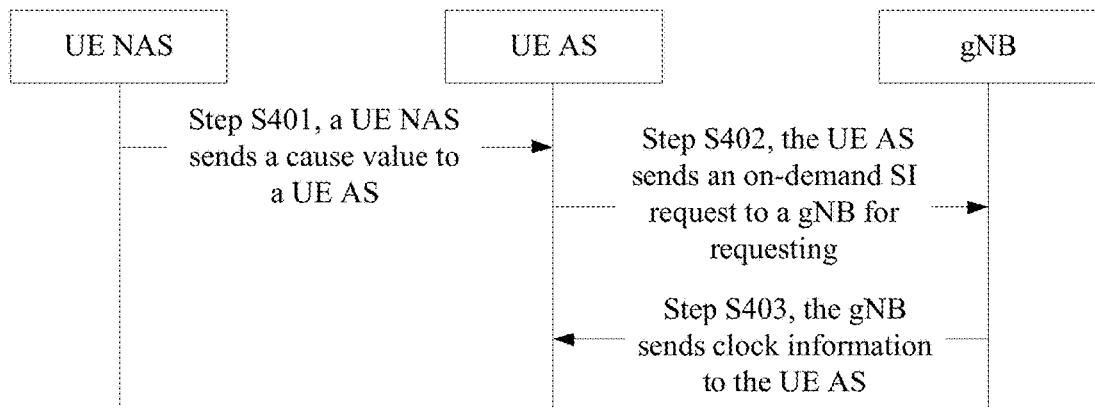
FIG. 4 is a flowchart of another information processing method for interaction between a terminal and a network device according to an embodiment of the present disclosure.

FIG. 4 is a flowchart of another information processing method for interaction between a terminal and a network device according to an embodiment of the present disclosure. As shown in FIG. 4, the method may include the steps as follows:

Step S401, a UE NAS sends a cause value to a UE AS. The indication information sent by the UE NAS to the UE AS may be embodied as a cause value, and the cause value correspondingly indicates that the service currently requested by the UE is a service of URLLC/TSN, or that a PDU session requested to be established is a service of URLLC/TSN, or that a service requested requires a high-precision clock, or that a service supported by the UE includes a URLLC/TSN service. The UE requiring high-precision clock information may be indicated by carrying the cause value in establishmentCause, reestablishmentCause, or ResumeCause.

Step S402, the UE AS sends an on-demand SI request to a gNB for requesting. After the UE AS obtains the cause value, if the UE does not have valid high-precision clock information currently, the UE needs to obtain high-precision clock information, that is, obtain SIB9 or Dlinformationtransfer. The UE may send an on-demand SI request to the gNB for requesting, and the on-demand SI request may include ondemandSIforSIB9.

Step S403, the gNB sends clock information to the UE AS. The gNB receives the ondemandSIforSIB9 sent by the UE, considers that the UE requires high-precision clock information, and may send high-precision clock information to the UE through SIB9 or dedicated RRC, for example, RRC reconfiguration information or Dlinformationtransfer.

Through the method mentioned above, the embodiment gives a method for the UE AS to obtain high-precision time information in the UL service triggering process, ensures that the UE AS requests high-precision clock information from the gNB when needed, clarifies the judgment condition for the UE AS to trigger the request process, and ensures the integrity and certainty of the system information request process. The above method of this embodiment may be mainly applied to the scenario where the terminal is in an idle/inactive state, which achieves the method for the UE AS to obtain high-precision clock information in the UL service triggering process, ensures that the UE AS requests high-precision clock information from the gNB when needed, clarifies the judgment condition for the UE AS to trigger the request process, and then ensures the integrity and certainty of the system information request process.

Figure 5:
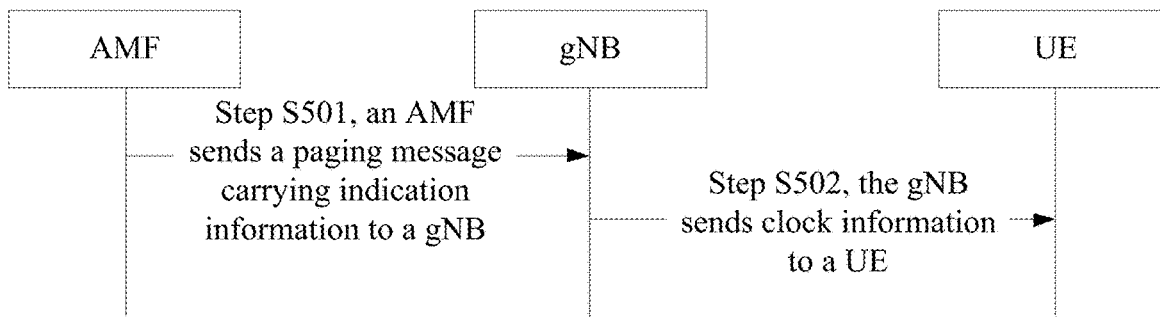
FIG. 5 is a flowchart of another information processing method for interaction between a terminal and a network device according to an embodiment of the present disclosure.

FIG. 5 is a flowchart of another information processing method for interaction between a terminal and a network device according to an embodiment of the present disclosure. As shown in FIG. 5, the method may include the steps as follows.

Step S501, an AMF sends a paging message carrying indication information to a gNB. The paging message carries the indication information, which is used to indicate that a currently requested service is a service of URLLC/TSN, or that a PDU session requested to be established corresponds to a service of URLLC/TSN, or that a requested service requires a high-precision clock. In an implementation, the AMF may send the paging message and carry the indication information in a case of an incoming call or a data push.

Step S502, the gNB sends clock information to a UE. The gNB receives the paging message sent by the AMF, and determines, according to the indication information contained in the paging message, that high-precision clock information needs to be sent, or that the requested service is a URLLC/TSN service, or that the requested service requires a high-precision clock, etc. According to the indication information, the gNB may send the clock information to the UE through the system information SIB9 (applicable to the connected state and/or the non-connected state UE). Or, according to the indication information and a UE identification, when the UE enters a connected state, the gNB sends the clock information to the UE through system information or a dedicated RRC message, for example, Dlinformation-transfer or RRC reconfiguration information. Certainly, in the connected state, the UE may also use other dedicated information to request system information, such as a RACH resource, UeassistanceInformation, and so on.

In this embodiment, a method for the UE to obtain high-precision clock information in the DL service triggering process is implemented, which ensures that the gNB sends the required clock information to the UE after learning the requirement of the terminal for sending clock information, so as to meet the transmission requirement of the TSN service of the UE.

Figure 6:
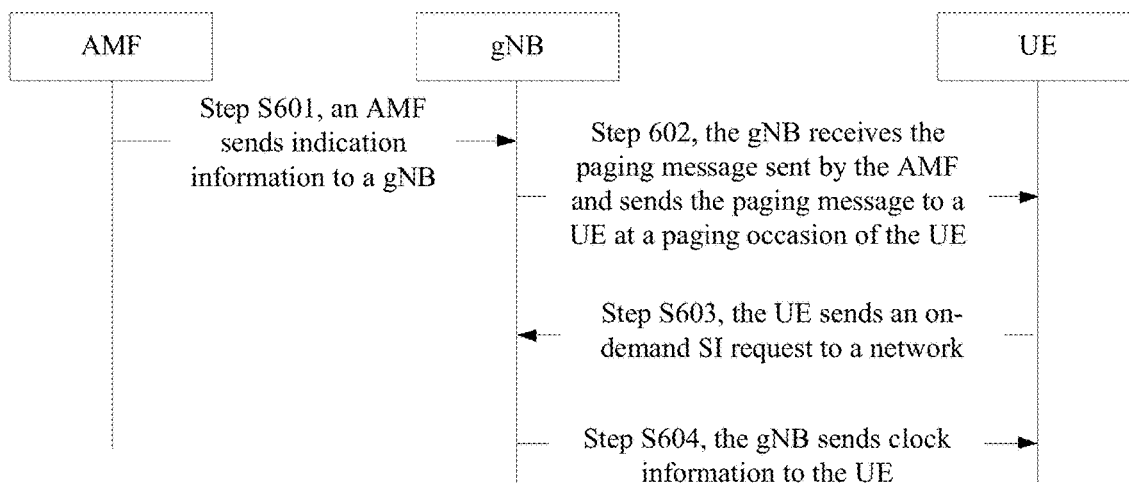
FIG. 6 is a flowchart of another information processing method for interaction between a terminal and a network device according to an embodiment of the present disclosure.

FIG. 6 is a flowchart of another information processing method for interaction between a terminal and a network device according to an embodiment of the present disclosure. As shown in FIG. 6, the method may include the steps as follows.

Step S601, an AMF sends indication information to a gNB. The paging message carries indication information, and the indication information is used to indicate that a currently requested service is a service of URLLC/TSN, or that a PDU session requested to be established corresponds to a service of URLLC/TSN, or that a requested service requires high-precision clock information, where the AMF may send the paging message carrying the indication information in a case of an incoming call or a data push.

Step S602, the gNB receives the paging message sent by the AMF and sends the paging message to a UE at a paging occasion of the UE. The paging message carries the indication information.

Step S603, the UE sends an on-demand SI request to a network. After receiving the paging message at a corresponding position, the UE determines, according to the indication information, that the service needed to be requested is a TSN service, or that a PDU session requested to be established corresponds to a service of URLLC/TSN, or that the requested service requires a high-precision clock, or determines that a high-precision clock is required. At this time, the UE sends the on-demand SI request to the gNB to request high-precision clock information.

Step S604, the gNB sends clock information to the UE. The gNB receives the on-demand SI request sent by the UE and may send high-precision clock information to the UE by broadcasting SIB9 or sending RRC dedicated information.

This embodiment implements the method of triggering a DL service, but the on-demand SI request is still triggered by the UE, thereby avoiding the extra processing on paging by the base station, ensuring that the gNB sends the required clock information to the UE after learning the requirement of the terminal for sending the clock information, and meeting the transmission requirement of the TSN service of the UE.

Figure 7:
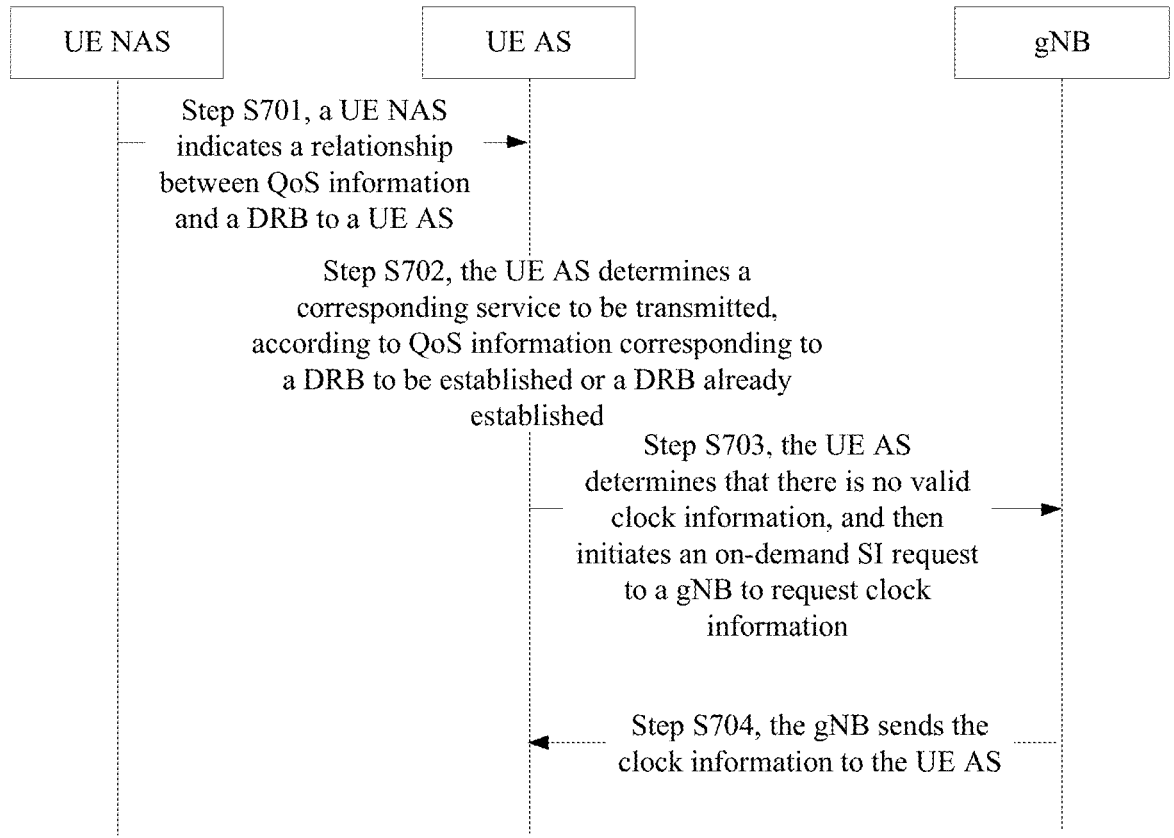
FIG. 7 is a flowchart of another information processing method for interaction between a terminal and a network device according to an embodiment of the present disclosure.

FIG. 7 is a flowchart of another information processing method for interaction between a terminal and a network device according to an embodiment of the present disclosure. As shown in FIG. 7, the method may include the steps as follows.

Step S701, a UE NAS indicates a relationship between QoS information and a DRB to a UE AS.

Step S702, the UE AS determines a corresponding service to be transmitted, according to QoS information corresponding to a DRB to be established or a DRB already established. The UE NAS in this embodiment may indicate the relationship between the QoS information and the DRB to the UE AS, and it is determined that the corresponding service to be transmitted is a URLLC/TSN service, a service requiring a high-precision clock, or the like.

Step S703, the UE AS determines that there is no valid clock information, and then initiates an on-demand SI request to a gNB to request clock information.

Step S704, the gNB sends the clock information to the UE AS.

Figure 8:
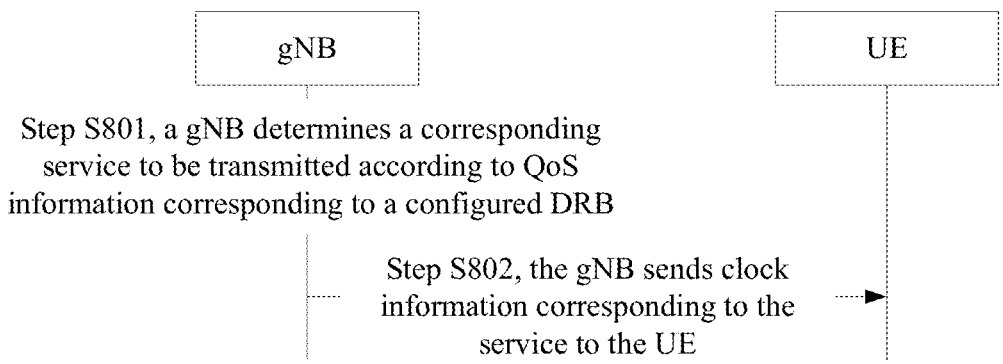
FIG. 8 is a flowchart of another information processing method for interaction between a terminal and a network device according to an embodiment of the present disclosure.

FIG. 8 is a flowchart of another information processing method for interaction between a terminal and a network device according to an embodiment of the present disclosure. As shown in FIG. 8, the method may include the steps as follows.

Step S801, a gNB determines a corresponding service to be transmitted according to QoS information corresponding to a configured DRB. A UE NAS indicates to a UE AS a relationship between the QoS information and the DRB, UE AS the service may be a URLLC/TSN service, or a service requiring high-precision clock information. Step S802, the gNB sends clock information corresponding to the service to the UE. Where, regardless of whether a UL or DL service is triggered, the method for the UE to obtain high-precision clock information is implemented, which ensures that the network can inform the UE of the clock information when the UE requires high-precision clock information, thereby meeting the transmission requirement of the TSN service of the UE.

Figure 9:
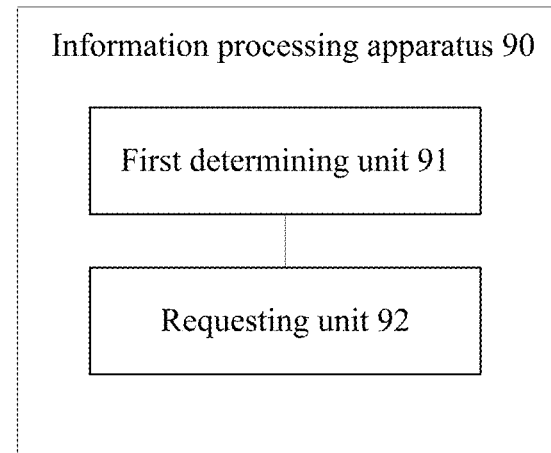
FIG. 9 is a schematic diagram of an information processing apparatus according to an embodiment of the present disclosure.

An embodiment of the present disclosure further provides an information processing apparatus, and the information processing apparatus of this embodiment may be used to implement the information processing method shown in FIG. 1 or FIG. 2, which have been described already and will not be repeated. FIG. 9 is a schematic diagram of an information processing apparatus according to an embodiment of the present disclosure. As shown in FIG. 9, the information processing apparatus 90 may include: a first determining unit 91, configured to determine information or a service that needs to be transmitted; a requesting unit 92, configured to request system information from a network device when the information processing apparatus is determining the transmission of the information or the service. The information processing apparatus in this embodiment may be provided in a terminal.

In an implementation, the requesting unit includes: a first requesting module, configured to request the system information from the network device if there is invalid system information when the information processing apparatus is determining the transmission of the information or the service. In an implementation, the requesting unit includes: a second requesting module, configured to request the system information from the network device based on indication information corresponding to the information or the service. In an implementation, the second requesting module includes: a first sending module, configured to send a system information demand request (on-demand SI request) to the network device based on the indication information; and a first obtaining module, configured to obtain the system information, where the system information is sent by the network device in response to the on-demand SI request. In an implementation, the second requesting module includes: a requesting sub-module, configured to request the system information from the network device based on the indication information through an Access Stratum (AS). In an implementation, the apparatus further includes: a first sending unit, configured to send the indication information to the AS through a non-access stratum (NAS). In an implementation, the first sending unit includes a second sending module, configured to send the indication information to the AS in at least one of the following request processes: a Service request Service request process, a packet data unit session establishment request (PDU session establishment request) process, or a packet data unit session modification request (PDU session modification request) process. In an implementation, the indication information is a cause value (cause). The cause value is carried by at least one of the following information: establishment cause establishmentCause information, reestablishment cause reestablishmentCause information, or resume cause ResumeCause information.

In an implementation, the apparatus further includes: a first obtaining unit, configured to obtain a paging message sent by the network device; and a second obtaining unit, configured to obtain the indication information from the paging message. In an implementation, the paging message sent by the network device includes a paging message sent by a core network to a base station, where the paging message carries the indication information. In an implementation, the first obtaining unit includes: a second obtaining module, configured to obtain the paging message sent by the base station; and/or, the second obtaining unit includes: a third obtaining module, configured to obtain the indication information from the paging message sent by the base station. The paging message is sent by the core network to the base station in a case of an incoming call or a data push. In an implementation, the second obtaining module includes: a receiving sub-module, configured to receive the paging message sent by the base station at a paging occasion of the terminal, where the paging message carries the indication information. In an implementation, the requesting unit includes: a fourth obtaining module, configured to obtain the system information which is determined by the network device according to the indication information of the information or the service carried in the paging message; or a fifth obtaining module, configured to obtain the system information which is sent by the network device according to the indication information of the information or the service carried in the paging message. In an implementation, the paging message is sent from a core network to a base station, and the system information is determined by the base station according to the indication information carried in the paging message; or the paging message is sent from the core network to the base station, and whether to send the system information is determined by the base station according to the indication information carried in the paging message.

In an implementation, the requesting unit includes: a third requesting module, configured to request the system information from the network device according to quality of serve QoS information of the information or the service. In an implementation, the third requesting module includes: a sending sub-module, configured to send an on-demand SI request to the network device; and a first obtaining sub-module, configured to obtain the system information sent by the network device in response to the on-demand SI request. In an implementation, the apparatus further includes: a second determining unit, configured to determine the QoS information according to one of a user plane bearer DRB, a packet data unit session PDU session, and a quality of service flow QoS flow, where the DRB is configured by a base station for the terminal through an RRC reconfiguration message. In an implementation, the system information is sent by the network device through at least one of the following information: a system information block (SIB), or radio resource control (RRC) information. The RRC information includes RRC reconfiguration information and/or downlink direct transfer information DLinformationtransfer. The system information block (SIB) includes an SIB for sending clock information, an SIB for sending positioning information, an SIB for sending Vehicle to X V2X information.

Figure 10:
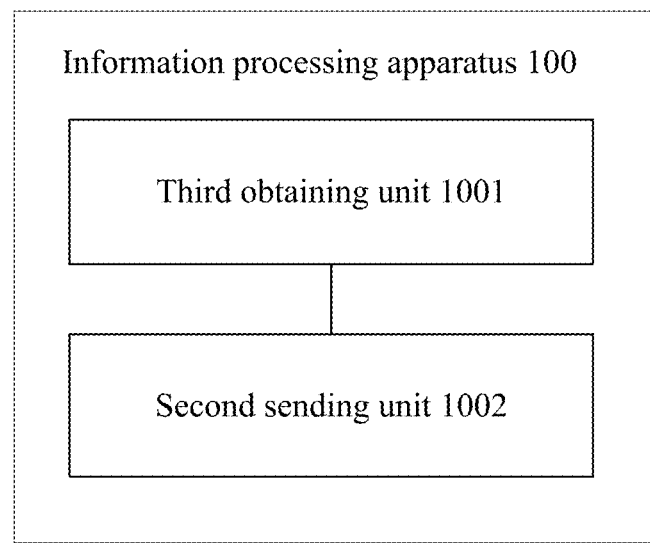
FIG. 10 is a schematic diagram of another information processing apparatus according to an embodiment of the present disclosure.

The present disclosure also provides another information processing apparatus, which is provided in a network device. FIG. 10 is a schematic diagram of another information processing apparatus according to an embodiment of the present disclosure. As shown in FIG. 10, the information processing apparatus 100 may include: a third obtaining unit 1001, configured to obtain a request, where the request is sent by a terminal when the terminal needs to transmit information or service; and a second sending unit 1002, configured to send system information to the terminal in response to the request. The request is sent by the terminal in a case that there is transmission of the information or the service and there is invalid system information.

In an implementation, the third obtaining unit includes: a sixth obtaining module, configured to obtain the request sent by the terminal based on indication information corresponding to the information or the service. In an implementation, the sixth obtaining module includes: a second obtaining sub-module, configured to obtain a system information demand request (on-demand SI request), where the on-demand SI request is sent by the terminal based on the indication information. In an implementation, the sixth obtaining module includes: a third obtaining sub-module, configured to obtain the request sent by an access stratum (AS) of the terminal based on the indication information. The indication information may be sent by a non-access stratum (NAS) of the terminal to the AS. In an implementation, the indication information is sent by the NAS to the AS in at least one of the following processes: a service request Service request process, a packet data unit session establishment request (PDU session establishment request) process, or a packet data unit session modification request (PDU session modification request) process. The indication information may be a cause value (cause), and the cause value may be carried by at least one of the following information: establishment cause establishmentCause information, reestablishment cause reestablishmentCause information, or resume cause ResumeCause information.

In an implementation, the apparatus further includes: a third sending unit, configured to send a paging message to the terminal, where the paging message carries the indication information. In an implementation, the third sending unit includes: a third sending module, configured to send the paging message carrying the indication information to a base station through a core network; and/or a fourth sending module, configured to send the paging message carrying the indication information to the terminal through the base station. In an implementation, the third sending module includes: a sending sub-module, configured to send the paging message to the base station through the core network in a case of an incoming call or a data push. The paging message sent by the base station is received by the terminal at a paging occasion of the terminal. In an implementation, the second sending unit includes: a fifth sending module, configured to determine to send the system information through indication information of the information or the service carried in the paging message and send the system information to the terminal. In an implementation, the second sending unit includes: a sixth sending module, configured to send the paging message to a base station through a core network, where the paging message carries the indication information, and the base station determines the system information according to the indication information; or a seventh sending module, configured to send the paging message to the base station through the core network, where the paging message carries the indication information, and the base station determines whether to send the system information according to the indication information carried in the paging message.

In an implementation, the second sending unit includes: an eighth sending module, configured to send the system information to the terminal through a base station according to Quality of Service (QoS) information of the information or the service. In an implementation, the apparatus further includes: a third determining unit, configured to determine the QoS information through the base station according to one of a user plane bearer (DRB), a packet data unit session (PDU session) and a Quality of Service flow (QoS flow), where the base station configures the DRB for the terminal through an RRC reconfiguration message. In an implementation, the apparatus further includes: a fourth sending unit, configured to send the system information to the terminal through at least one of the following information: a system information block (SIB), or radio resource control (RRC) information, where the RRC information includes RRC reconfiguration information and/or downlink direct transfer information DLinformationtransfer. In an implementation, the system information block (SIB) includes: an SIB for sending clock information, an SIB for sending positioning information, and an SIB for sending V2X information.

It should be noted that the above-mentioned units or modules may be implemented by software or hardware, and the latter may be implemented in the following ways, but not be limited thereto: the above-mentioned units or modules are all located in the same processor, or the above-mentioned units or modules are located in different processors in any combination.

Figure 11:
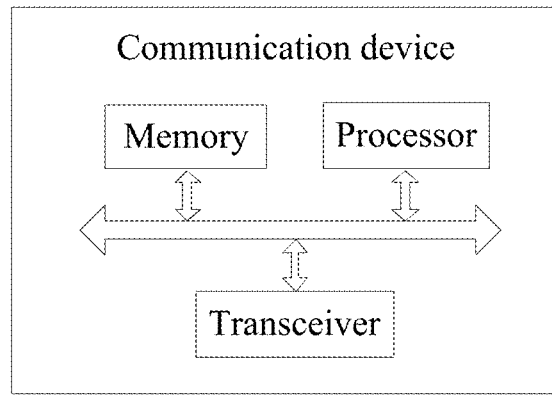
FIG. 11 is a schematic structural diagram of a communication device according to an embodiment of the present disclosure.

FIG. 11 is a schematic structural diagram of a communication device according to an embodiment of the present disclosure. As shown in FIG. 11, a communication device includes a processor, which may call and run a computer program from a memory to implement the method according to the embodiment of the present disclosure. In an implementation, as shown in FIG. 11, the communication device may further include a memory. The processor may call and run a computer program from the memory to implement the method according to the embodiment of the present disclosure. The memory may be a separate device independent of the processor or may be integrated into the processor. In an implementation, as shown in FIG. 11, the communication device may further include a transceiver, and the processor may control the transceiver to communicate with other devices. Specifically, the transceiver may send information or data to other devices or receive information or data sent by other devices. The transceiver may include a transmitter and a receiver. The transceiver may further include an antenna, and the number of the antenna may be one or more. In an implementation, the communication device may specifically be a network device in an embodiment of the present disclosure, and the communication device may implement the corresponding processes implemented by the network device in each method of the embodiments of the present disclosure, which will not be repeated here for the sake of conciseness. In an implementation, the communication device may specifically be a mobile terminal/terminal device of an embodiment of the present disclosure, and the communication device may implement the corresponding processes implemented by the mobile terminal/terminal device in each method of the embodiments of the present disclosure, which will not be repeated for the sake of conciseness.

Figure 12:
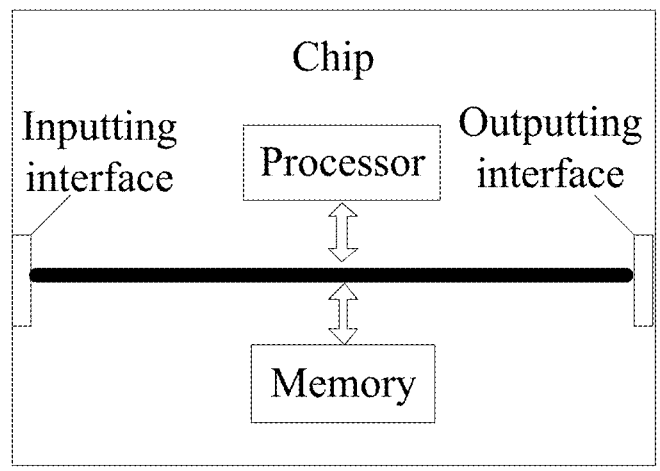
FIG. 12 is a schematic structural diagram of a chip according to an embodiment of the present disclosure.

FIG. 12 is a schematic structural diagram of a chip structure according to an embodiment of the present disclosure. As shown in FIG. 12, the chip includes a processor, and the processor may call and run a computer program from a memory to implement the method according to the embodiments of the present disclosure. In an implementation, as shown in FIG. 12, the chip may further include a memory. The processor may call and run a computer program from the memory to implement the method according to the embodiments of the present disclosure. The memory may be a separate device independent of the processor, or may be integrated in the processor. In an implementation, the chip may further include an input interface. The processor may control the input interface to communicate with other devices or chips, and specifically, may acquire information or data sent by other devices or chips. In an implementation, the chip may further include an output interface. The processor may control the output interface to communicate with other devices or chips, and specifically, may output information or data to other devices or chips. In an implementation, the chip may be applied to the network device in the embodiments of the present disclosure, and the chip may implement the corresponding procedures implemented by the network device in each method of the embodiments of the present disclosure, which will not be repeated for the sake of conciseness. In an implementation, the chip may be applied to the mobile terminal/terminal device in the embodiments of the present disclosure, and the chip may implement the corresponding procedures implemented by the mobile terminal/terminal device in each method of the embodiments of the present disclosure, which will not be repeated for the sake of conciseness. It should be understood that the chip mentioned in the embodiment of the present disclosure may also be referred to as a system-level chip, a system chip, a chip system, or a system-on-chip, etc.

Figure 13:
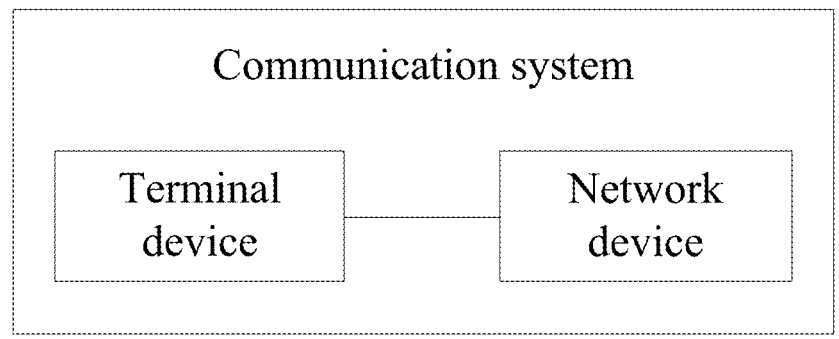
FIG. 13 is a structural block diagram of a communication system according to an embodiment of the present disclosure.

FIG. 13 is a structural block diagram of a communication system according to an embodiment of the present disclosure. As shown in FIG. 13, the communication system includes a terminal device and a network device. The terminal device may be configured to implement the corresponding function implemented by the terminal device in the foregoing method, and the network device may be configured to implement the corresponding function implemented by the network device in the foregoing method, which will not be repeated for the sake of conciseness. It should be understood that the processor of the embodiment of the present disclosure may be an integrated circuit chip with a signal processing capability. In an implementation process, the steps of the foregoing method embodiments may be completed by an integrated logic circuit of hardware in the processor or by instructions in the form of software. The above-mentioned processor may be a general-purpose processor, a digital signal processor (DSP), an application specific integrated circuit (ASIC), a field programmable gate array (FPGA), or other programming logic devices, discrete gates or transistor logic devices, discrete hardware components. The methods, steps, and logical block diagrams disclosed in the embodiments of the present disclosure may be implemented or executed. The general-purpose processor may be a microprocessor or the processor may also be any conventional processor or the like. The steps of the method disclosed in the embodiments of the present disclosure may be directly embodied as being executed and completed by a hardware decoding processor, or executed and completed by a combination of hardware and software modules in the decoding processor. The software module may be located in a mature storage medium in the field such as a random-access memory, a flash memory, a read-only memory, a programmable read-only memory, or an electrically erasable programmable memory, a register. The storage medium is located in the memory, and the processor reads the information in the memory and completes the steps of the above method in combination with its hardware.

It can be understood that the memory in the embodiments of the present disclosure may be a volatile memory or a non-volatile memory, or may include both the volatile memory and the non-volatile memory. The non-volatile memory may be a read-only memory (ROM), a programmable read-only memory (Programmable ROM, PROM), an erasable programmable read-only memory (Erasable PROM, EPROM), and an electrically programmable read-only memory (Electrically EPROM, EEPROM) or a flash memory. The volatile memory may be a random-access memory (RAM), which is used as an external cache. By way of example rather than limiting illustration, many forms of RAM are available, such as a static random-access memory (Static RAM, SRAM), a dynamic random-access memory (Dynamic RAM, DRAM), a synchronous dynamic random-access memory (Synchronous DRAM, SDRAM), a double data rate synchronous dynamic random-access memory (Double Data Rate SDRAM, DDR SDRAM), an enhanced synchronous dynamic random-access memory (Enhanced SDRAM, ESDRAM), a synchlink dynamic random-access memory (Synchlink DRAM, SLDRAM) and a direct rambus random-access memory (Direct Rambus RAM, DR RAM). It should be noted that the memories of the systems and methods described herein are intended to include, but are not limited to, these and any other suitable types of memories. It should be understood that the above-mentioned memory is illustrative but not restrictive, for example, the memory in the embodiment of the present disclosure may also be a static random-access memory (static RAM, SRAM), a dynamic random-access memory (dynamic RAM, DRAM), a synchronous dynamic random-access memory (synchronous DRAM, SDRAM), a double data rate synchronous dynamic random-access memory (double data rate SDRAM, DDR SDRAM), an enhanced synchronous dynamic random-access memory (enhanced SDRAM, ESDRAM), a synch link dynamic random-access memory (synch link DRAM, SLDRAM), and a direct rambus random-access memory (Direct Rambus RAM, DR RAM), etc. That is to say, the memories in the embodiments of the present disclosure are intended to include, but not limited to, these and any other suitable types of memories.

An embodiment of the present disclosure further provides a computer-readable storage medium for storing a computer program. In an implementation, the computer-readable storage medium may be applied to the network device in the embodiment of the present disclosure, and the computer program causes the computer to execute the corresponding procedures implemented by the network device in each method of the embodiments of the present disclosure, which will not be repeated herein for brevity. In an implementation, the computer-readable storage medium may be applied to the mobile terminal/terminal device in the embodiments of the present disclosure, and the computer program causes the computer to execute the corresponding procedures implemented by the mobile terminal/terminal device in each method of the embodiments of the present disclosure, which will not be repeated herein for brevity. An embodiment of the present disclosure also provides a computer program product, including computer program instructions. In an implementation, the computer program product may be applied to the network device in the embodiments of the present disclosure, and the computer program instructions cause the computer to execute the corresponding procedures implemented by the network device in each method of the embodiments of the present disclosure, which will not be repeated herein for brevity. In an implementation, the computer program product may be applied to the mobile terminal/terminal device in the embodiments of the present disclosure, and the computer program instructions cause the computer to execute the corresponding procedures implemented by the mobile terminal/terminal device in each method of the embodiments of the present disclosure, which will not be repeated herein for brevity. An embodiment of the present disclosure also provides a computer program. In an implementation, the computer program may be applied to the network device in the embodiments of the present disclosure. When running on a computer, the computer program causes the computer to execute the corresponding procedures implemented by the network device in each method of the embodiments of the present disclosure, which will not be repeated herein for brevity. In an implementation, the computer program may be applied to the mobile terminal/terminal device in the embodiments of the present disclosure. When running on a computer, the computer program causes the computer to execute the corresponding procedures implemented by the mobile terminal/terminal device in each method of the embodiments of the present disclosure, which will not be repeated herein for brevity.

Those of ordinary skill in the art will appreciate that the units and algorithm steps of the examples described in combination with the embodiments disclosed herein may be implemented by electronic hardware or a combination of computer software and electronic hardware. Whether these functions are executed by hardware or software depends on the specific disclosure and design constraints of the technical solution. The professional technicians may use different methods for each specific disclosure to implement the described functions, but such implementation should not be considered to be beyond the scope of the present disclosure. Those skilled in the art may clearly understand that, for convenience and conciseness of the description, for the specific working processes of the above-described system, devices, and units, reference may be made to the corresponding processes in the foregoing method embodiments, which will not be repeated herein. In the several embodiments provided by the present disclosure, it should be understood that the disclosed system, device, and method may be implemented in other ways. For example, the apparatus embodiments described above are merely illustrative. For example, the division of the units is only a logical function division, and there may be other divisions in actual implementation. For example, multiple units or components may be combined or be integrated into another system, or some features may be ignored or not implemented. In addition, the mutual coupling or direct coupling, or communication connections shown or discussed herein may be indirect coupling or communication connections through some interfaces, devices, or units, and may be in electrical, mechanical, or other forms. The units described as separate components may or may not be physically separate.

The components displayed as units may or may not be physical units, that is, they may be located in one place, or may be distributed to multiple network units. Some or all of the units may be selected according to actual needs to achieve the objectives of the solutions of the embodiments. In addition, the functional units in the embodiments of the present disclosure may be integrated into one processing unit, or each unit may exist alone, physically, or two or more units may be integrated into one unit. If the functions are implemented in the form of a software functional unit and sold or used as independent products, they may be stored in a computer-readable storage medium. Based on this understanding, the technical solution of the present disclosure in essence, or the part contributing to the existing technology, or a part of the technical solution may be embodied in the form of a software product. The computer software product is stored in a storage medium and includes instructions for causing a computer device (which may be a personal computer, a server, or a network device, etc.) to perform all or part of the steps of the methods described in the embodiments of the present disclosure. The aforementioned storage media includes various media that may store program code, such as a USB flash disk, a mobile hard disk, a ROM, a RAM, a magnetic disk or an optical disk.

The above merely describes specific implementations of the present disclosure, but the protection scope of the present disclosure is not limited thereto, and changes or substitutions that may easily be thought of by those skilled in the art within the technical scope disclosed in the present disclosure should be covered by the scope of protection of the present disclosure. Therefore, the scope of protection of the present disclosure should be subject to the scope of protection of the claims.

What is claimed is:

1. An information processing method, comprising:
   determining, by a terminal, a service that needs to be transmitted by the terminal, wherein the service is a time-sensitive network (TSN) service; and
   requesting, by the terminal, system information from a network device when the terminal is determining transmission of the service, wherein the system information is high-precision clock information, the high-precision clock information being used by the terminal for ensuring time synchronization with the network device, and the high-precision clock information is reference clock information referenceTimeInfo, and is sent by the network device through a system information block SIB9 or downlink direct transfer information DLinformationtransfer;
   wherein the requesting, by the terminal, the system information from the network device comprises: obtaining, by the terminal, indication information from the network device; sending, by the terminal, a system information demand request to the network device based on the indication information, wherein the system information demand request is dedicated information, the dedicated information is UE assistance information UEassistanceInformation; and obtaining, by the terminal, the system information, wherein the system information is sent by the network device in response to the system information demand request.

2. The method according to claim 1, wherein the requesting, by the terminal, the system information from the network device comprises: if there is invalid system information when the terminal is determining the transmission of the service, requesting, by the terminal, the system information from the network device.

3. The method according to claim 1, wherein the requesting, by the terminal, the system information from the network device further comprises: requesting, by the terminal, the system information from the network device based on the indication information of the service.

4. An information processing apparatus, which is provided in a terminal and comprises:
   a memory and a processor,
   wherein the memory stores therein a computer program, and the processor is configured to run the computer program to:
   determine a service that needs to be transmitted by the information processing apparatus, wherein the service is a time-sensitive network (TSN) service; and
   request system information from a network device when the information processing apparatus is determining transmission of the service, wherein the system information is high-precision clock information, the high-precision clock information being used by the terminal for ensuring time synchronization with the network device, and the high-precision clock information is reference clock information referenceTimeInfo, and is sent by the network device through at least one of the following information: a system information block SIB9 or downlink direct transfer information DLinformationtransfer;
   wherein the processor is configured to run the computer program to: obtain indication information from the network device; send a system information demand request to the network device based on the indication information, wherein the system information demand request is dedicated information, the dedicated information is UE assistance information UEassistanceInformation; and obtain the system information, wherein the system information is sent by the network device in response to the system information demand request.

5. The apparatus according to claim 4, wherein the processor is configured to run the computer program to: request the system information from the network device if there is invalid system information when the information processing apparatus is determining the transmission of the service.

6. The apparatus according to claim 4, wherein the processor is configured to run the computer program to: request the system information from the network device based on the indication information of the service.

7. An information processing apparatus, which is provided in a network device and comprises:
   a processor and a memory;
   wherein the memory stores therein a computer program, and the processor is configured to run the computer program to:
   obtain a request, wherein the request is sent by a terminal when the terminal needs to transmit a service, wherein the service is a time-sensitive network (TSN) service; and
   send, through a system information block SIB9 or downlink direct transfer information DLinformationtransfer, system information to the terminal in response to the request, wherein the system information is high-precision clock information, the high-precision clock information being used by the terminal for ensuring time synchronization with the network device, and the high-precision clock information is reference clock information referenceTimeInfo;
   wherein the processor is configured to run the computer program to: send indication information to the terminal;

and obtain a system information demand request, wherein the system information demand request is dedicated information, the dedicated information is UE assistance information UEassistanceInformation, and the system information demand request is sent by the terminal based on the indication information.

8. The apparatus according to claim 7, wherein the request is sent by the terminal in a case that there is transmission of the service and there is invalid system information.

9. The apparatus according to claim 8, wherein the processor is configured to run the computer program to: obtain the request which is sent by the terminal based on the indication information of the service.

10. The apparatus according to claim 7, wherein the processor is configured to run the computer program to:
   send the system information in response to the system information demand request.

11. A non-transitory computer storage medium, wherein the storage medium comprises a stored program, and the program, when run, controls a device where the storage medium is located to execute the method according to claim 1.

12. The method according to claim 1, wherein the indication information is a cause value.

* * * * *